United States Patent
Hwang et al.

(10) Patent No.: US 11,192,474 B1
(45) Date of Patent: Dec. 7, 2021

(54) RETRACTABLE CAR SEAT

(71) Applicants: HYUNDAI MOTOR COMPANY, Seoul (KR); KIA MOTORS CORPORATION, Seoul (KR)

(72) Inventors: Jin Ho Hwang, Cheonan-si (KR); Dong Eun Cha, Hwaseong-si (KR); Sang Heon Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/074,900

(22) Filed: Oct. 20, 2020

(30) Foreign Application Priority Data

Jun. 1, 2020 (KR) .................. 10-2020-0065732

(51) Int. Cl.
*B60N 2/30* (2006.01)
*B60N 2/12* (2006.01)

(52) U.S. Cl.
CPC .......... *B60N 2/3088* (2013.01); *B60N 2/12* (2013.01)

(58) Field of Classification Search
CPC ...... B60N 2/12; B60N 2/3088; B60N 2/3029; B60N 2/3031; B60N 2/3045; B60N 2/3063; B60N 2/3097
USPC .................................. 297/334, 344.13, 331
See application file for complete search history.

(56) References Cited

U.S. PATENT DOCUMENTS

| | | | | |
|---|---|---|---|---|
| 6,899,392 B1 * | 5/2005 | Saberan | ................. | B60N 2/206 297/317 |
| 7,152,921 B2 * | 12/2006 | Saberan | .................. | B60N 2/12 297/336 |
| 8,297,703 B2 * | 10/2012 | Ehrhard | ................ | B60N 2/3065 297/331 |
| 8,556,323 B2 * | 10/2013 | Hoge | ................... | B60N 2/3045 296/65.13 |
| 10,647,432 B2 * | 5/2020 | Itzinger | ................ | B60N 2/3031 |
| 2011/0168077 A1 * | 7/2011 | Bostrom | ................. | B63B 29/06 114/363 |

(Continued)

FOREIGN PATENT DOCUMENTS

| | | | | |
|---|---|---|---|---|
| FR | 3005289 A1 * | 11/2014 | ......... | B60N 2/01583 |
| JP | 2000-118277 A | 4/2000 | | |
| JP | 2003-118438 A | 4/2003 | | |

(Continued)

OTHER PUBLICATIONS

Korean Office Action dated Jul. 23, 2021 issued in Korean Patent Application No. 10-2020-0065732.

*Primary Examiner* — Milton Nelson, Jr.

(74) *Attorney, Agent, or Firm* — Morgan, Lewis & Bockius LLP

(57) ABSTRACT

The present disclosure provides a retractable car seat that is folded and stowed in a vehicle. The retractable car seat includes: a body configured to be folded or unfolded; a frame movably connected to the body to support the body such that the body is configured to be folded or unfolded; a support having an end connected to a lower portion of the body or the frame and another end movably connected to a floor of the vehicle, being able to move forward and backward in the vehicle, and having a length that can be vertically adjusted; and a rail disposed on the floor of the vehicle and having the support inserted therein, thereby functioning as a path in which the support is moved.

19 Claims, 6 Drawing Sheets

100(110,120,130,140)
200(210,220,230,240)
300(310,320)

(56) References Cited

U.S. PATENT DOCUMENTS

2012/0091771 A1    4/2012   Haller et al.

FOREIGN PATENT DOCUMENTS

| JP | 2008-030653 A | 2/2008 | | |
|---|---|---|---|---|
| KR | 10-1998-0062445 A | 10/1998 | | |
| WO | WO-2008057037 A1 | * | 5/2008 | ............. B60N 2/525 |

* cited by examiner

100(110,120,130,140)
200(210,220,230,240)
300(310,320)

RETRACTABLE CAR SEAT

CROSS REFERENCE TO RELATED APPLICATION

The present application claims priority to Korean Patent Application No. 10-2020-0065732, filed Jun. 1, 2020, the entire contents of which is incorporated herein for all purposes by this reference.

TECHNICAL FIELD

The present disclosure relates to a retractable car seat that includes a foldable body and a movable frame connected to the body, thereby being able to be used as a seat when it is unfolded and be stowed in a vehicle by folding.

BACKGROUND

In general, car seats are provided for a driver and passengers to sit in a vehicle. In a vehicle, the seats are arranged to face the front and the backs of the seats can be reclined, but the backs cannot be moved at the fixed positions.

Car seats occupy the largest volume of the interior of a vehicle. If a seat is too small, a passenger feels uncomfortable when he/she sits therein, and if a seat is too large, the size of the car body increases, so seats having appropriate sizes are provided for the use of vehicle. However, since seats cannot be removed from a vehicle even if the seats are not used, there is a problem that the unused seats occupy a space and the interior of vehicle cannot be freely used.

In particular, the interior of a vehicle is expected to be used in various ways due to development of autonomous vehicles. Since participation of a person in a vehicle decreases, it is expected that various activities such as sleeping or watching movies in a vehicle are possible. Since the demand for using the interior of an autonomous vehicle is higher, a fixed seat may cause many problems.

Accordingly, it is required to develop a retractable car seat that can be folded and stowed in a vehicle to minimize the volume when it is not used. The present disclosure proposes a retractable car seat including a foldable body that can be folded and stowed in a vehicle.

SUMMARY

The present disclosure has been made in an effort to solve the problems and an objective of the present disclosure is to provide a retractable car seat including a foldable seat, thereby being able to be used as a seat by unfolding or to be stowed in a vehicle by folding, and being able to move in a vehicle.

In order to achieve the objectives of the present disclosure, a retractable car seat that is folded and stowed in a vehicle includes: a body configured to be folded or unfolded; a frame movably connected to the body to support the body a such that the body is configured to be folded or unfolded; a support having an end connected to a lower portion of the body or the frame and another end movably connected to a floor of the vehicle, being able to move forward and backward in the vehicle, and having a length vertically adjustable; and a rail disposed on the floor of the vehicle and having the support inserted therein, the rail providing a path in which the support is moved.

The body may include: a back part rotatably connected to the support; and a seat part connected to an upper portion of the support and configured to be rotatable with respect to the support.

The back part may include a first member and a second member spaced downward apart from the first member and having a lower end connected to the support; when the body is folded, the first member may be moved down and positioned in front of the second member; and when the seat part is rotated, the seat part may be positioned in front of the first member.

A first guide recessed inward and elongated up and down may be provided in the rear of the second member; the frame may include a first frame connected to the first member and the second member and having a first moving member inserted in the first guide and sliding up and down in the first guide, and a second frame connected to the rear of the first frame and to the second member; and the first frame may be movably connected with the second member and the second frame, whereby the first frame slides up and down.

The first moving member may have a first fixing member that fixes a position of the first moving member in the first guide and the frame may have a first lever connected to the first fixing member through a first wire to operate the first fixing member, whereby fixing a position of the first member. The first member may be connected to the first frame and configured to rotate a predetermined angle.

The body may further include a headrest disposed over the back part, and the frame may further include a fourth frame having an end connected to the headrest and another end rotatably connected to the back part so as to adjust an angle of the headrest.

The support may include an upper support connected to the body and a lower support connected to a bottom of the upper support, having a length that is vertically adjusted, and moving with a lower end inserted in the rail.

The back part may be rotatably connected to the upper support and the seat part may be connected to the upper support to be able to move forward and backward.

A second guide recessed inward and elongated in a front-rear direction may be provided in the upper support and the seat part may have a second moving member inserted in the second guide and sliding forward and backward in the second guide, whereby adjusting a position of the seat part.

The moving member may be rotatably connected to the seat part.

A third guide recessed inward and elongated in a front-rear direction may be provided in the seat part and the frame may include a third frame having an end rotatably connected to the support and another end connected to the seat part, and having a third moving member sliding forward and backward in the third guide.

The third moving member may have a second fixing member that fixes a position of the third moving member in the third guide and the seat part may have a second lever connected to the second fixing member through a second wire to operate the second fixing member, whereby fixing a position of the seat part with an angle thereof adjusted.

The retractable car seat according to the present disclosure can be unfolded and used as a seat and can be folded and stowed in a vehicle because it has a foldable structure, so there is an effect that the interior of a vehicle can be efficiently used.

Further, the body and the frame constituting the seat are movably connected to each other and the positions can be changed in accordance with the body structure or the sitting posture of a passenger, so the seat can be transformed into the most comfortable posture and the volume thereof can be minimized when it is folded. Accordingly, there is an effect that the volume of a storage box in a vehicle can be minimized.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION OF THE DISCLOSURE

Figure 1:
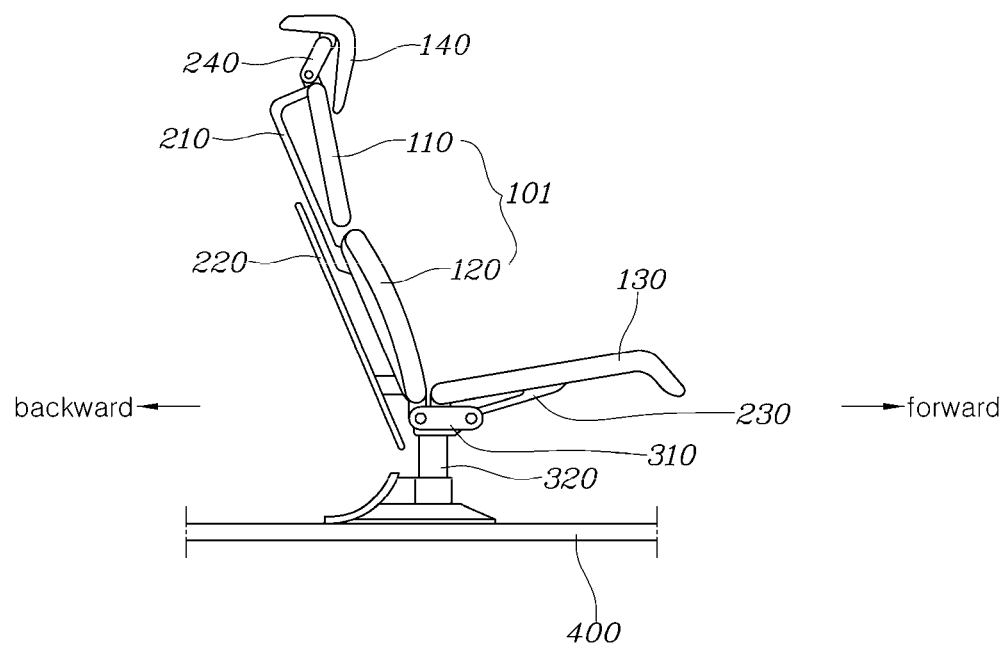
FIG. 1 is a side view of a retractable car seat according to an embodiment of the present disclosure.

In the following description, the structural or functional description specified to exemplary embodiments according to the concept of the present disclosure is intended to describe the exemplary embodiments, so it should be understood that the present disclosure may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present disclosure are not limited to the embodiments which will be described hereinbelow with reference to the accompanying drawings, but all of modifications, equivalents, and substitutions are included in the scope and spirit of the present disclosure.

It will be understood that, although the terms first and/or second, etc. may be used herein to describe various elements, but these elements should not be limited by these terms. These terms are only used to distinguish one element, from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. In addition, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

The present disclosure will be described hereafter in detail by describing exemplary embodiments of the present disclosure with reference to the accompanying drawings. Like reference numerals given in the drawings indicate like components.

The present disclosure relates to retractable car seat that has a foldable structure, thereby being able to be used for a person to sit therein when it is unfolded and being able to be stowed when it is folded.

FIG. 1 is a side view of a retractable car seat according to an embodiment of the present disclosure. Referring to FIG. 1, a retractable car seat according to an embodiment of the present disclosure may include a body 100, a frame 200, a support 300, and a rail 400.

The body 100 is a part on which a portion of the body of a passenger is seated. The body 100 may be equipped with a cushion to make a passenger feel comfortable when the passenger's body touches it. The body 100 may have a foldable structure. The body 100 may have a chair shape when it is unfolded and a shape minimizing the volume when it is folded.

The body 100 may include a back part 101 and a seat part 130. The back part 101 can support the upper body of a passenger and the seat part 130 can support the lower body of the passenger. The lower end of the back part 101 is rotatably connected to the support 300, so the seat can be reclined.

The seat part 130 may be connected to the upper portion of the support 300 to be able to rotate about the support 300. The seat part 130 can be brought in close contact with the back part 101, so the volume can be minimized.

The frame 200 is a part connected to the body 100 to support the body 100. The frame 200 may be made of a rigid material to be able to support the weight of a passenger sitting in the seat. The frame 200 may be movably connected to the body 100 so that the body 100 can be folded or unfolded.

The support 300 is a part supporting the body 100 over the floor of a vehicle. An end of the support 300 may be connected to the bottom of the body 100 and another end may be movably connected to the floor of a vehicle. The support 300 may be configured to be movable forward and backward in the vehicle. Accordingly, it is possible to adjust position of the body 100 when the body 100 is unfolded and it is also possible to adjust the position of the body 100 to stow the seat in the vehicle when the body 100 is folded.

The support 300 can be vertically stretched and retracted. It is possible to adjust the height of the seat when a person sits in the seat or when the seat is stowed in the vehicle.

The rail 400 is a part that is the movement path of the support 300. The rail 400 may be disposed on the floor of the vehicle. The lower end of the support 300 is inserted in and connected to the rail 400, so the support 300 can be move forward and backward.

The configuration of folding and unfolding the retractable car seat according to an embodiment of the present disclosure is described hereafter.

Figure 2:
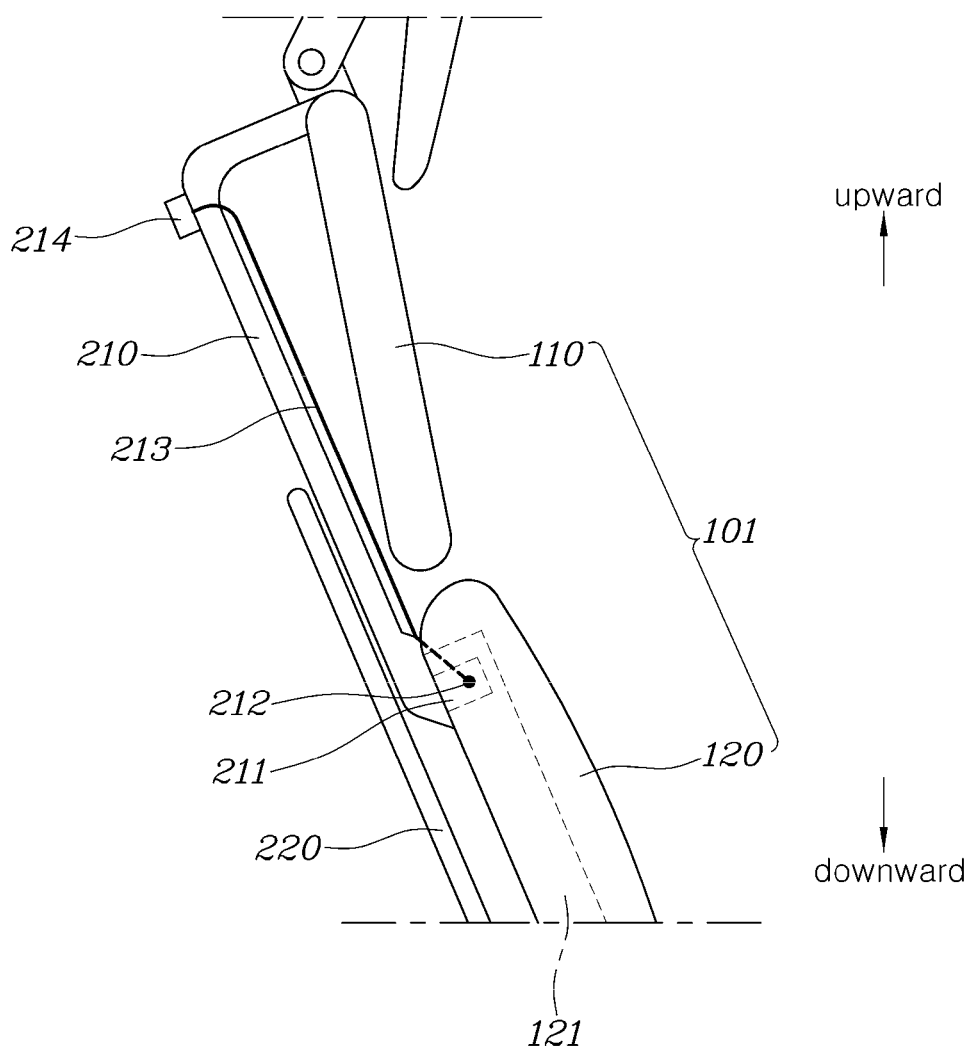
FIG. 2 is an enlarged view of the back part of the retractable car seat according to an embodiment of the present disclosure.

FIG. 2 is an enlarged view of the back part 101 of the retractable car seat according to an embodiment of the present disclosure. Referring to FIG. 2, the back part 101 may be composed of a first member 110 and a second member 120.

The first member 110 can support the upper portion of the upper body of a passenger and the second member 120 can support the lower portion of the lower body of the passenger.

The second member 120 is spaced a predetermined distance downward apart from the first body 110 and the lower end thereof may be connected to the support 300.

When the seat is folded, the first member 110 can move down and overlap the second member 120. When the first member 110 moves down, the first member 110 is positioned in front of the second member 120, so the back part 101 is retracted. Further, in this state, when the seat part 130 is rotated, the back part 101 and the seat part 130 can overlap each other.

Meanwhile, as shown in FIG. 2, the frame 200 may include a first frame 210 and a second frame 220. The first frame 210 is connected to the first member 110 and the second member 120 and can fix the first member 110 over the second member 120. The second frame 220 may be connected to the rear of the first frame 210 and to the second member 120.

The first frame 210 may be connected to be movable with respect to the second frame 220. The first frame 210 is connected to be able to slide up and down with respect to the second frame 220, so the first member 110 can be moved downward. The first member 110 may be connected to be able to rotate a predetermined angle with respect to the first frame 210. When folding the retractable car seat according to an embodiment of the present disclosure, it is possible to rotate the first member 110 forward and then move down the first member 110 ahead of the second member 120.

In detail, a first guide 121 recessed inward and elongated up and down may be formed in the rear of the second member 120. The first frame 210 may have a first moving member 211 inserted in the first guide 121 to slide up and down in the first guide 121.

When the first moving member 211 slides up and down in the first guide 121, the first frame 210 can slide up and down while changing the position of the joint between the first frame 210 and the second frame 220. Since the first frame 210 is connected to be movable with respect to the second frame 220, when the first moving member 211 slides in the first guide 121, the first frame 210 can be moved, whereby the first member 110 can be moved up and down.

The frame 200 may further have a first fixing member 212 that fixes the position of the first moving member 211. The first fixing member 212 can perform the function of fixing the position of the first moving member 211 in the first guide 121. The frame 200 may further have a first lever 214 connected to the first fixing member 212 through a first wire 213. A passenger can lock or unlock the first moving member 211 by operating the first fixing member 212 through the first lever 214. A passenger, if necessary, can adjust the height of the back part 101 by adjusting the joint between the first frame 210 and the second frame 120 by sliding the first moving member 211 and can fix the first moving member 211 through the first fixing member 212 with the height adjusted. An embodiment of the first fixing member 212 will be described below with reference to FIG. 4.

Figure 3:
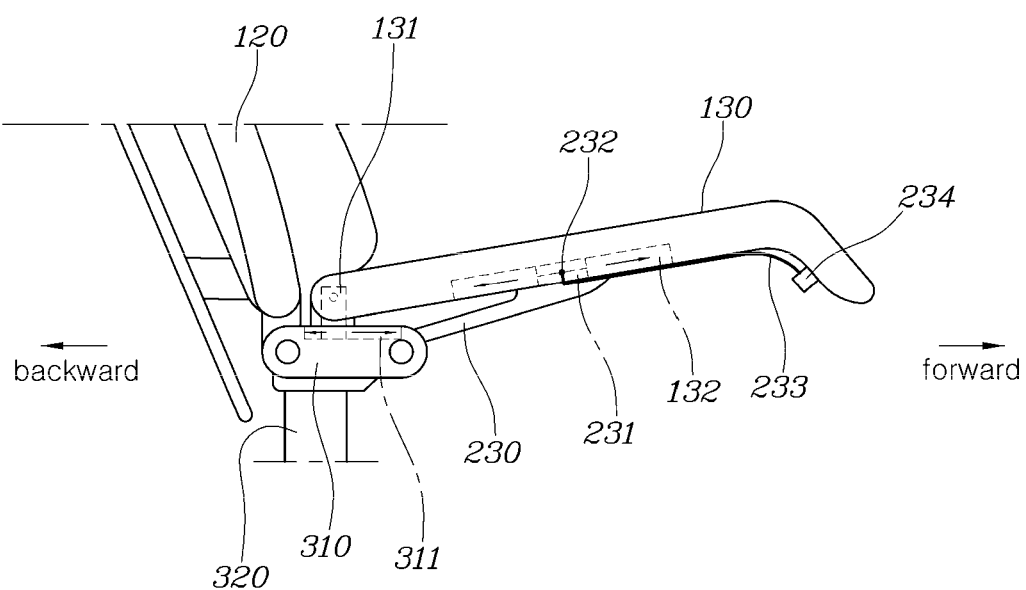
FIG. 3 is an enlarged view of the seat part of the retractable car seat according to an embodiment of the present disclosure.

FIG. 3 is an enlarged view of the seat part 130 of the retractable car seat according to an embodiment of the present disclosure.

The support 300 may be composed of an upper support 310 and a lower support 320. The upper support 310 may be connected to the body 100. The lower support 320 may be connected to the bottom of the upper support 310 and the length thereof can be vertically adjusted. The lower end of the lower support 320 is movably inserted in the rail 400.

The back part 101 and the seat part 130 may be connected to the upper support 310. The back part 101 can be rotated a predetermined angle with respect to the upper support 310, so the back part 101 can be reclined. The seat part 120 can be moved on the upper support 310.

Referring to FIG. 3, a second guide 311 recessed inward and elongated in the front-rear direction may be formed in the upper support 310. The seat part 130 may have a second moving member 131 inserted in the second guide 311 to slid forward and backward in the second guide 311.

As the second moving member 131 slides forward and backward in the second guide 311, the position of the joint between the seat part 130 and the upper support 310 can be adjusted. Since the position is adjusted by moving the second moving member 131, the exposed position of the seat part 130 in the interior can be adjusted, so it is possible to move the seat part 130 to the most comfortable position, depending on the body structure or sitting posture of a passenger.

The second moving member 131 may be rotatably connected to the seat part 130. It is possible to minimize the volume when stowing the seat by pulling forward the seat part 130 and then rotating the seat part 130 to come in close contact with the back part 101.

The lower end of the back part 101 is rotatably connected to the support 300, so the seat can be reclined. The seat part 130 may be connected to the upper portion of the support 300 to be able to rotate about the support 300. The seat part 130 can be brought in close contact with the back part 101, so the volume can be minimized.

A third guide 132 recessed inward and elongated in the front-rear direction may be formed in the seat part 130. A third frame 230 connected to the support frame 300 may be connected to the bottom of the seat part 130. That is, a first end of the third frame 230 is connected to the support 300 and a second end is connected to the seat part 130. The first end of the third frame 230 can be rotated with respect to the support 300. The third frame 230 may have a third moving member 231 that slides forward and backward in the third guide 132.

When the second moving member 131 slides forward and backward in the second guide 311, the third moving member 231 slides forward and backward in the third guide 132. Accordingly, the position of the seat part 130 is moved forward and backward on the support 300. When the seat part 130 is rotated to come in close contact with the back part 101, the seat part 130 is rotated about the second moving member 131 and the third frame 230 can also be rotated.

A third fixing member that fixes the position of the third moving member 231 in the third guide 132 may be provided for the third moving member 231. The seat part 130 may have a second lever 234 connected to a second fixing member 232 through a second wire 233. A passenger can lock or unlock the third moving member 231 by operating the second fixing member 232 through the second lever 234.

Figure 4:
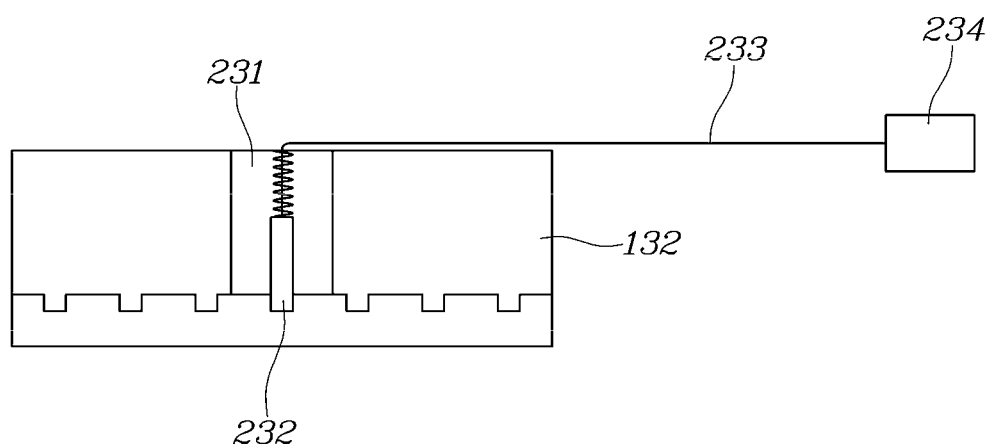
FIG. 4 is a view showing that the retractable car seat according to an embodiment of the present disclosure is fixed by a first fixing member and a second fixing member.

FIG. 4 is a view showing that the retractable car seat according to an embodiment of the present disclosure is fixed by the first fixing member 212 and the second fixing member 232. FIG. 4 shows the second fixing member 232 and the first fixing member 212 may be applied in the same way.

Referring to FIG. 4, grooves may be formed on the inner side of the third guide 132 and the second fixing member 232 may be inserted into the grooves. An elastic member is disposed opposite the groove, so the second fixing member 232 can be supported toward the grooves. The second wire 233 connected to the second fixing member 232 may be exposed out of the second fixing member 232 and connected to the second lever 234.

When a passenger wants to adjust the position of the seat part 130, he/she can pull the second lever 234. In this case, the second wire 233 connected to the second lever 234 is pulled and the second fixing member 232 comes out of a groove while pressing the elastic member. Accordingly, the third moving member 231 is unlocked and the passenger can move the unlocked third moving member 231. When the passenger releases the second lever 234 at an appropriate position, the second fixing member 232 can be protruded toward a groove and inserted into the groove by the restoring force of the elastic member, whereby the seat part 130 can be fixed again.

This mechanism may be applied not only to the second fixing member 232, but to the first fixing member 212. The mechanism shows an embodiment of the first fixing member 212 or the second fixing member 232, and the present disclosure is not necessarily limited thereto.

Figure 5:
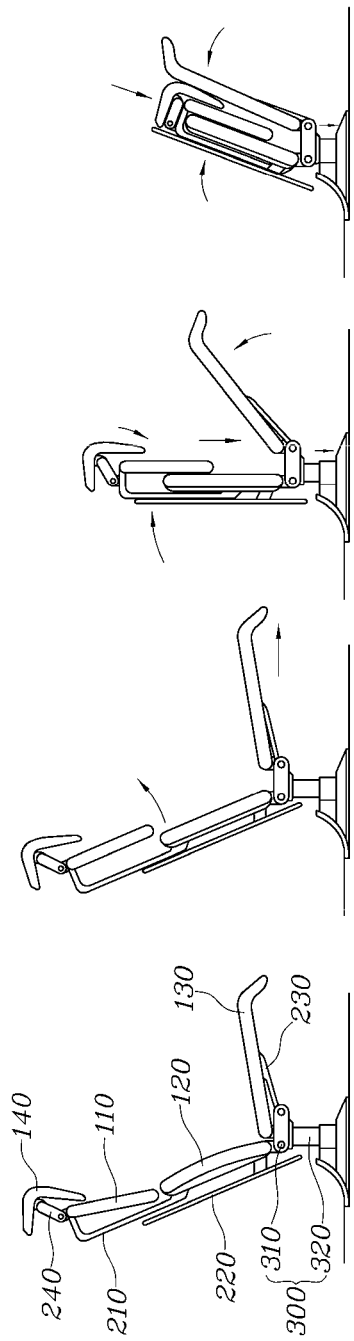
FIG. 5 is a view showing a process in which the retractable car seat according to an embodiment of the present disclosure is folded.

FIG. 5 is a view showing a process in which the retractable car seat according to an embodiment of the present disclosure is folded.

The body 100 may further include a headrest 140. The headrest 140 is a part on which the head of a passenger is leaned. The headrest 140 may be disposed over the back part 101.

The headrest 140 may be connected to the back part 101 through a fourth frame 240 of the frame 200. An end of the fourth frame 240 of the frame 200 may be connected to the headrest 140 and another end may be connected to be rotated a predetermined angle with respect to the back part 101. A passenger can lean his/her head on the headrest 140 in the most comfortable posture by adjusting the angle of the headrest 140 by adjusting the angle between the fourth frame 240 of the frame 200 and the back part 101. When the seat is folded and stowed in a vehicle, the headrest 140 can be brought in close contact with the back part 101, thereby being able to minimize the volume. The headrest 140 may have a shape bending rearward so that the back part 101 can be fitted in the headrest 140 when the seat is folded.

A process in which the retractable car seat according to an embodiment of the present disclosure is folded is described with reference to FIG. 5.

First, the first member 110 is rotated forward a predetermined angle to be spaced from the second member 120 and then the seat part 130 is moved forward on the support 300. The first member 110 is moved down to position in front of the second member 120 such that the back part 101 is folded and the headrest 140 is rotated to be positioned in front of the first member 110. The seat part 130 is rotated with respect to the support 300 to overlap the back part 101. Accordingly, the back part 101, the seat part 130, and the headrest 140 overlap each other, whereby the volume can be minimized. The support 300 is retracted.

Thereafter, the second member 120 and the seat part 130 are inclined forward, whereby the seat can be stowed at an appropriate angle in the vehicle. A storage box may be provided at the front or rear part in the vehicle and the seat can be stowed in the vehicle not to be exposed outside.

Figure 6:
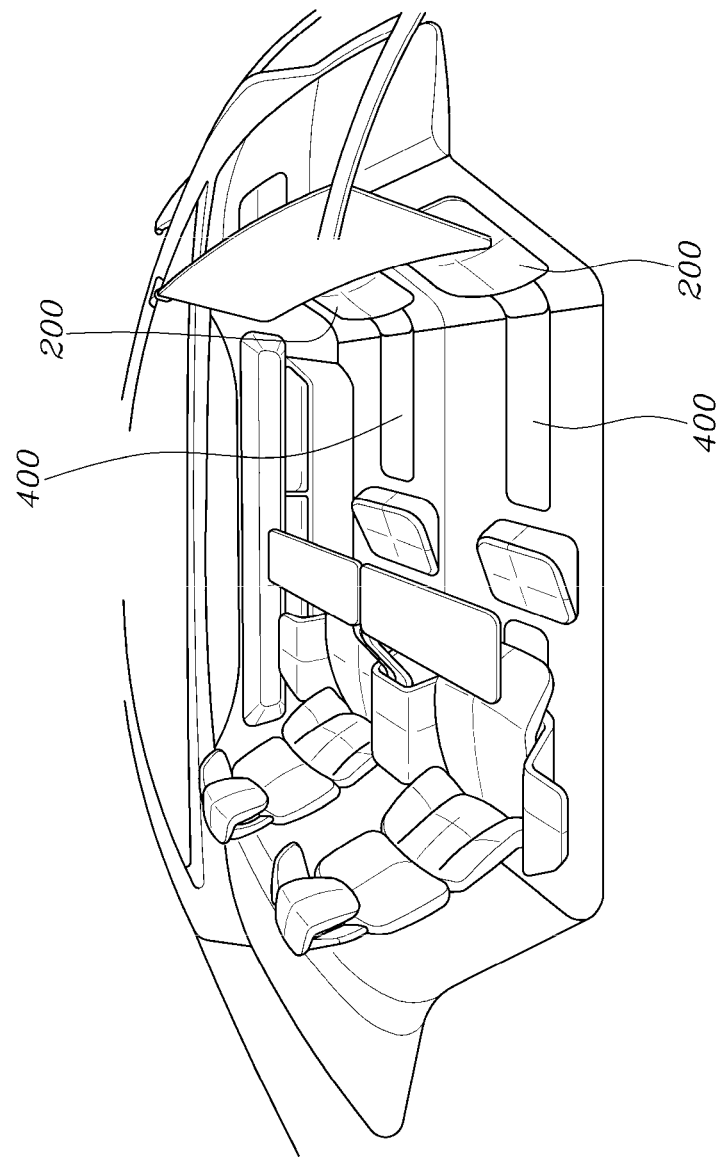
FIG. 6 is a view showing the inside of a vehicle when the retractable car seat according to an embodiment of the present disclosure is stowed in a vehicle.

FIG. 6 is a view showing the inside of a vehicle when the retractable car seat according to an embodiment of the present disclosure is stowed in a vehicle.

In FIG. 6, the front seats are the retractable car seat according to an embodiment of the present disclosure and are stowed in a vehicle. As shown in FIG. 6, the retractable car seat according to an embodiment of the present disclosure can be inserted in the lower portion of the front instrument panel of the vehicle. When the seat is folded and stowed, only the frame 200 is exposed to the outside, and the body 100 and the support 300 can be stored in the vehicle.

Accordingly, the front area from the rear seats can be empty space. As shown in FIG. 6, it is possible to watch movies through a display installed in the vehicle and use the space for other activities.

As described above, there is an advantage that the retractable car seat according to an embodiment of the present disclosure can be used as a seat and it is possible to secure a free interior space of a vehicle by stowing the seat in the vehicle when not using the seat. Accordingly, various activities are possible in the vehicle that is driven by the autonomous technology.

Although the present disclosure was provided above in relation to specific embodiments shown in the drawings, it is apparent to those skilled in the art that the present disclosure may be changed and modified in various ways without departing from the scope of the present disclosure, which is described in the following claims.

What is claimed is:

1. A retractable car seat configured to be folded and stowed in a vehicle, the retractable car seat comprising:
   a body configured to be folded or unfolded;
   a frame movably connected to the body to support the body such that the body is configured to be folded or unfolded; and
   a support having an end connected to a lower portion of the body or the frame and another end movably connected to a floor of the vehicle,
   wherein the support includes an upper support connected to the body or the frame and a lower support connected to a bottom of the upper support, the lower support having a length that is vertically adjusted, and
   the body includes:
      a back part rotatably connected to the support; and
      a seat part connected to an upper portion of the support and configured to be rotatable with respect to the support.

2. The retractable car seat of claim 1, wherein the support is configured to be moved forward and backward in the vehicle, and a length of the support is vertically adjustable.

3. The retractable car seat of claim 1, further comprising a rail disposed on the floor of the vehicle and having the support inserted therein, the rail providing a path in which the support is moved.

4. The retractable car seat of claim 1, wherein the body further includes a headrest disposed over the back part, and the frame further includes a fourth frame having an end connected to the headrest and another end rotatably connected to the back part so as to adjust an angle of the headrest.

5. The retractable car seat of claim 1, wherein the back part includes a first member and a second member spaced downward apart from the first member and having a lower end connected to the support;
   when the body is folded, the first member is moved down and positioned in front of the second member; and
   when the seat part is rotated, the seat part is positioned in front of the first member.

6. The retractable car seat of claim 5, wherein a first guide recessed inward and elongated up and down is provided in the rear of the second member;
   the frame includes a first frame connected to the first member and the second member and having a first moving member inserted in the first guide and sliding up and down in the first guide, and a second frame connected to the rear of the first frame and to the second member; and the first frame is movably connected with the second member and the second frame, whereby the first frame slides up and down.

7. The retractable car seat of claim 6, wherein the first moving member has a first fixing member that fixes a position of the first moving member in the first guide, and the frame has a first lever connected to the first fixing member through a first wire to operate the first fixing member, whereby fixing a position of the first member.

8. The retractable car seat of claim 6, wherein the first member is connected to the first frame and is configured to rotate a predetermined angle.

9. The retractable car seat of claim 1, further comprising a rail disposed on the floor of the vehicle, having the support inserted therein, the rail providing a path in which the support is moved, wherein the lower support is configured to move with a lower end inserted in the rail.

10. The retractable car seat of claim 9, wherein the back part is rotatably connected to the upper support and the seat part is connected to the upper support so as to move forward and backward.

11. The retractable car seat of claim 10, wherein a second guide recessed inward and elongated in a front-rear direction is provided in the upper support, and the seat part has a second moving member inserted in the second guide and sliding forward and backward in the second guide, whereby adjusting a position of the seat part.

12. The retractable car seat of claim 11, wherein the second moving member is rotatably connected to the seat part.

13. The retractable car seat of claim 1, wherein a third guide recessed inward and elongated in a front-rear direction is provided in the seat part, and the frame includes a third frame having an end rotatably connected to the support and another end connected to the seat part, and having a third moving member sliding forward and backward in the third guide.

14. The retractable car seat of claim 13, wherein the third moving member has a second fixing member that fixes a position of the third moving member in the third guide, and the seat part has a second lever connected to the second fixing member through a second wire to operate the second fixing member, whereby fixing a position of the seat part with an angle thereof adjusted.

15. A retractable car seat configured to be folded and stowed in a vehicle, the retractable car seat comprising:
 a body configured to be folded or unfolded;
 a frame movably connected to the body to support the body such that the body is configured to be folded or unfolded; and
 a support having an end connected to a lower portion of the body or the frame and another end movably connected to a floor of the vehicle,
 wherein the body includes:
  a back part rotatably connected to the support; and
  a seat part connected to an upper portion of the support and configured to be rotatable with respect to the support,
 wherein the back part includes a first member and a second member spaced downward apart from the first member and having a lower end connected to the support,
 when the body is folded, the first member is moved down and positioned in front of the second member, and
 when the seat part is rotated, the seat part is positioned in front of the first member.

16. The retractable car seat of claim 15, further comprising a rail disposed on the floor of the vehicle and having the support inserted therein, the rail providing a path in which the support is moved.

17. The retractable car seat of claim 15, wherein the support is configured to be moved forward and backward in the vehicle, and a length of the support is vertically adjustable.

18. A retractable car seat configured to be folded and stowed in a vehicle, the retractable car seat comprising:
 a body configured to be folded or unfolded;
 a frame movably connected to the body to support the body such that the body is configured to be folded or unfolded; and
 a support having an end connected to a lower portion of the body or the frame and another end movably connected to a floor of the vehicle,
 wherein the body includes:
  a back part rotatably connected to the support;
  a seat part connected to an upper portion of the support and configured to be rotatable with respect to the support; and
  a headrest disposed over the back part, and
 the frame further includes a fourth frame having an end connected to the headrest and another end rotatably connected to the back part so as to adjust an angle of the headrest.

19. The retractable car seat of claim 18, wherein the support is configured to be moved forward and backward in the vehicle, and a length of the support is vertically adjustable.

* * * * *